(12) United States Patent
Chelaidite et al.

(10) Patent No.: US 12,692,921 B2
(45) Date of Patent: Jul. 28, 2026

(54) BALL-SCREW DRIVE FOR ELECTROMECHANICAL BRAKE

(71) Applicant: ZF Active Safety US Inc., Livonia, MI (US)

(72) Inventors: Galus Chelaidite, South Lyon, MI (US); Kraig E. Gerber, Plymouth Township, MI (US); Changming Wu, Plymouth, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 151 days.

(21) Appl. No.: 18/635,451

(22) Filed: Apr. 15, 2024

(65) Prior Publication Data

US 2025/0320900 A1     Oct. 16, 2025

(51) Int. Cl.
*F16D 65/18* (2006.01)
*F16D 125/36* (2012.01)
*F16D 125/40* (2012.01)

(52) U.S. Cl.
CPC .......... *F16D 65/18* (2013.01); *F16D 2125/36* (2013.01); *F16D 2125/40* (2013.01)

(58) Field of Classification Search
CPC .. F16D 2121/24; F16D 65/18; F16D 2125/36; F16D 2125/40; B60T 13/74; F16H 25/2214
See application file for complete search history.

(56) References Cited

U.S. PATENT DOCUMENTS

| | | | |
|---|---|---|---|
| 6,814,190 B1 * | 11/2004 | Olschewski | ............ F16H 25/22 188/162 |
| 7,930,949 B2 * | 4/2011 | Singh | ...................... F16H 25/20 74/424.82 |
| 9,976,614 B2 | 5/2018 | Gerber et al. | |
| 2023/0151879 A1 | 5/2023 | Knop et al. | |

* cited by examiner

*Primary Examiner* — Victor L Macarthur

(74) *Attorney, Agent, or Firm* — Tarolli, Sundheim, Covell & Tummino LLP

(57) ABSTRACT

A ball-screw drive for an actuator assembly of a vehicle brake includes a ball screw rotatable about an axis and having an exterior track winding extending around the ball screw from a first opening to a second opening. An inner recess extends into the ball screw and is connected to the first and second openings. A ball nut includes an interior track winding and is positioned over the ball screw so as to be movable along the axis in response to rotation of the ball screw for applying the vehicle brake. Balls are provided between the track windings. A tube extends continuously through the recess between the openings and cooperates with the track windings to form a recirculation loop for the balls during brake application.

22 Claims, 9 Drawing Sheets

BALL-SCREW DRIVE FOR ELECTROMECHANICAL BRAKE

TECHNICAL FIELD

The present invention relates generally to electromechanical brakes and, in particular, relates to a ball-screw drive for an actuator assembly of the electromechanical brake.

BACKGROUND

Most vehicles are equipped with a brake system for slowing or stopping movement of the vehicle in a controlled manner. A typical brake system for a modern automobile or light truck includes a disc brake assembly for each of the front wheels as well as a disc brake assembly for each of the rear wheels. The brake assemblies are actuated by hydraulic or pneumatic pressure generated when an operator of the vehicle depresses a brake pedal. A future brake system replaces the hydraulic or pneumatic brake system with an electromechanical brake system that uses an electrical power source to actuate subassemblies including an electric motor, a transmission and a ball nut assembly can be used to actuate the service brake during typical or emergency events as well as to actuate the parking brake. In some instances, the balls in the ball nut assembly are recirculated in an endless loop during operation of the electromechanical brake system.

SUMMARY OF THE INVENTION

In one example, a ball-screw drive for an actuator assembly of a vehicle brake includes a ball screw rotatable about an axis and having an exterior track winding extending around the ball screw from a first opening to a second opening. An inner recess extends into the ball screw and is connected to the first and second openings. A ball nut includes an interior track winding and is positioned over the ball screw so as to be movable along the axis in response to rotation of the ball screw for applying the vehicle brake. Balls are provided between the track windings. A tube extends continuously through the recess between the openings and cooperates with the track windings to form a recirculation loop for the balls during brake application.

In another example, a ball-screw drive for an actuator assembly of a vehicle brake includes a ball screw rotatable about an axis and having an exterior track winding extending around the ball screw from a first opening to a second opening. An inner recess extends into the ball screw and is connected to the first and second openings. A ball nut includes an interior track winding and is positioned over the ball screw so as to be movable along the axis in response to rotation of the ball screw for applying the vehicle brake. Balls are provided between the track windings. A bent tube extends continuously through the recess in an unsupported manner and has a first end positioned within the first opening and a second end positioned within the second opening. The first and second ends have deflectors for directing balls into and out of the respective first and second openings. The tube cooperates with the track windings to form a recirculation loop for the balls during brake application.

Other objects and advantages and a fuller understanding of the invention will be had from the following detailed description and the accompanying drawings.

DETAILED DESCRIPTION

Figure 1:
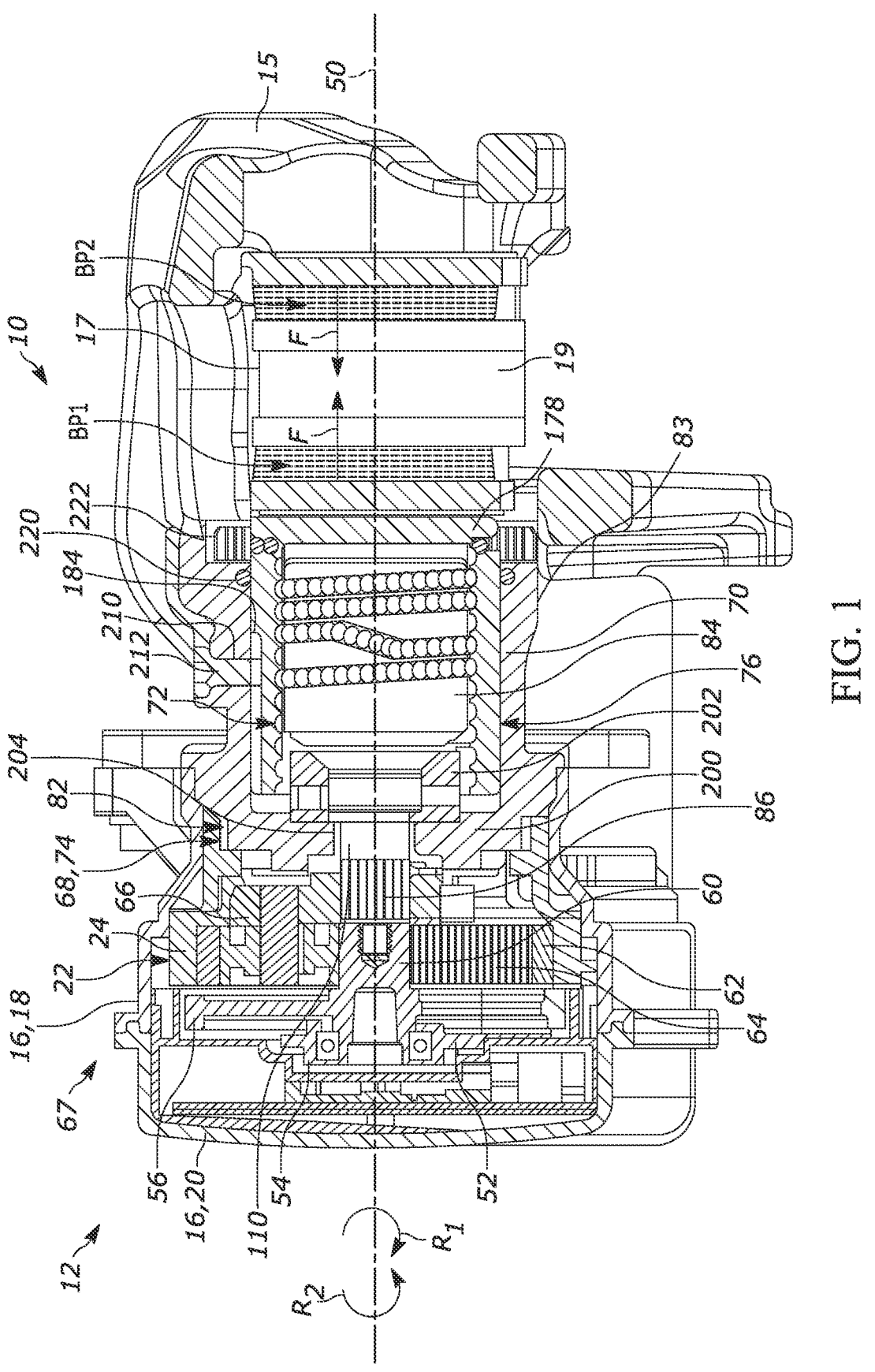
FIG. 1 is a sectional view of an actuator assembly having an example ball screw drive in accordance with the present invention.

The present invention relates generally to electromechanical brakes and, in particular, relates to a ball-screw drive for an actuator assembly of the electromechanical brake. FIG. 1 illustrates an example actuator assembly 10 for a vehicle brake in accordance with an aspect of the invention.

The actuator assembly 10 includes a control assembly 12 and a drive assembly 14 which can be assembled as separate subunits. The control assembly 12 and the drive assembly 14 are arranged in a common, shell-shaped housing 16. The housing 16 includes a substantially sleeve-shaped housing part 18 and a housing cover 20. The housing 16 and cover 20 are both formed from plastic and sealed together along an interface when assembled.

The actuator assembly 10 includes a brake caliper 15 defining a gap 17 for receiving a brake rotor 19. First and second brake pads BP1, BP2 are provided in the brake caliper 15 on opposite sides of rotor 19.

Figure 2:
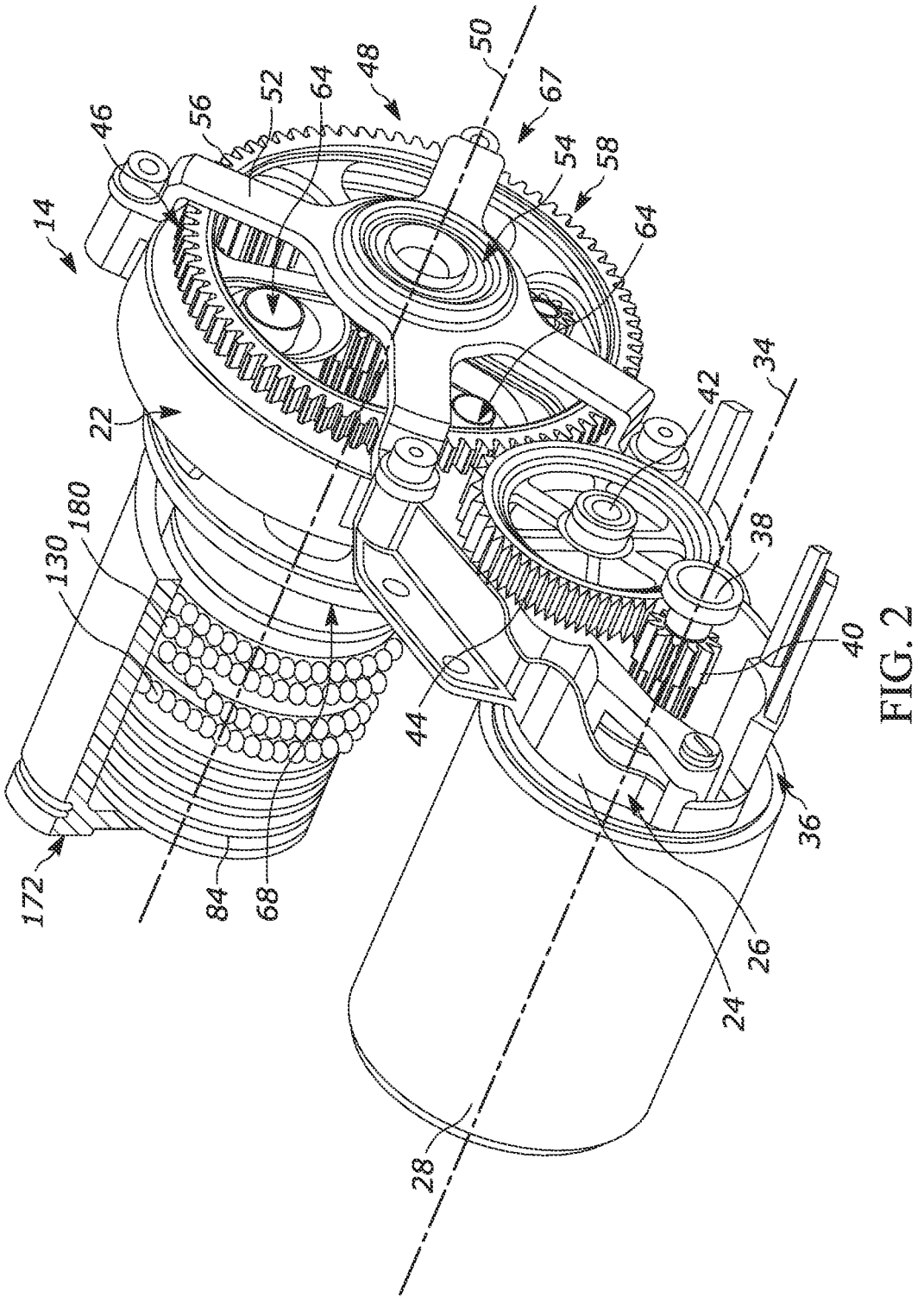
FIG. 2 is a perspective view of a drive assembly of the actuator assembly of FIG. 1.

The drive assembly 14 includes a carrier assembly 22 having a frame part 24 shown in FIG. 2. The frame part 24 includes first and second mounting interfaces 26, 68. The first mounting interface 26 receives a motor 28 for supplying torque to the drive assembly 14. With this in mind, the frame part 24 is configured to engage and hold the motor 28 in a manner that allows the frame part to absorb the forces of the motor 28 during its operation.

The motor 28 is rotatable about an axis 34 centered on the first mounting interface 26 and extends into an anti-rotation recess 36 in the frame part 24. The motor 28 includes an output shaft 38 rotatable with an pinion gear 40 about the axis 34. The pinion gear 40 is meshed with a gear 44 mounted on a bearing pin 42 provided on the frame part 24.

The frame part 24 further includes a receiving cavity 46 having a central axis 50 that is substantially parallel to the axis 34 of the first mounting interface 26. A cross-shaped reinforcing part 52 is secured to the frame part 24 and aligned with the receiving cavity 46. As shown, a bearing 54 is provided at the center of the reinforcing part 52 and aligned with the axis 34. The bearing 54 receives a gear 56 of a planetary gear stage 48. The gear 56 is meshed with the gear 44 mounted on the frame part 24. A gear train 58 is formed by the gears, 40, 44, 58 with the pinion gear 40 acting as the input member thereof. Consequently, the motor 28 is capable of supplying torque to the planetary gear stage 48 via the pinion gear 40.

The planetary gear stage 48 further includes a sun gear 60, a ring gear 62, three planet gears 64, and an actuator output, e.g., a carrier 66, arranged together in a known manner (see also FIG. 1). The sun gear 60 is formed integrally and rotatable with the gear 56. The ring gear 62 extends substantially along an inner circumference of the receiving cavity 46. The planet gears 64 are rotatably mounted on the carrier 66, which forms the output element of the planetary gear stage 48. The gear train 58 and the planetary gear stage 48 together are also referred to as a gear unit 67.

The caliper 15 is received by the second mounting interface 68 in a non-rotatable manner. To this end, the caliper 15 includes an anti-rotation feature 82 configured to mate with a corresponding anti-rotation feature 80 on the second mounting interface 68. In one example, the features 80, 82 are mating splines. With this arrangement, the brake caliper 15 can be inserted along the central axis 50 into the second mounting interface 68 and be held therein in an interlocking, rotationally fixed manner. The brake caliper 15 includes a sleeve 70 defining an outer wall 83 bearing the anti-rotation feature 82. The sleeve 70 opens towards the gap 17 and receives a ball-screw drive 72 aligned with the brake pads BP1, BP2.

Figure 3:
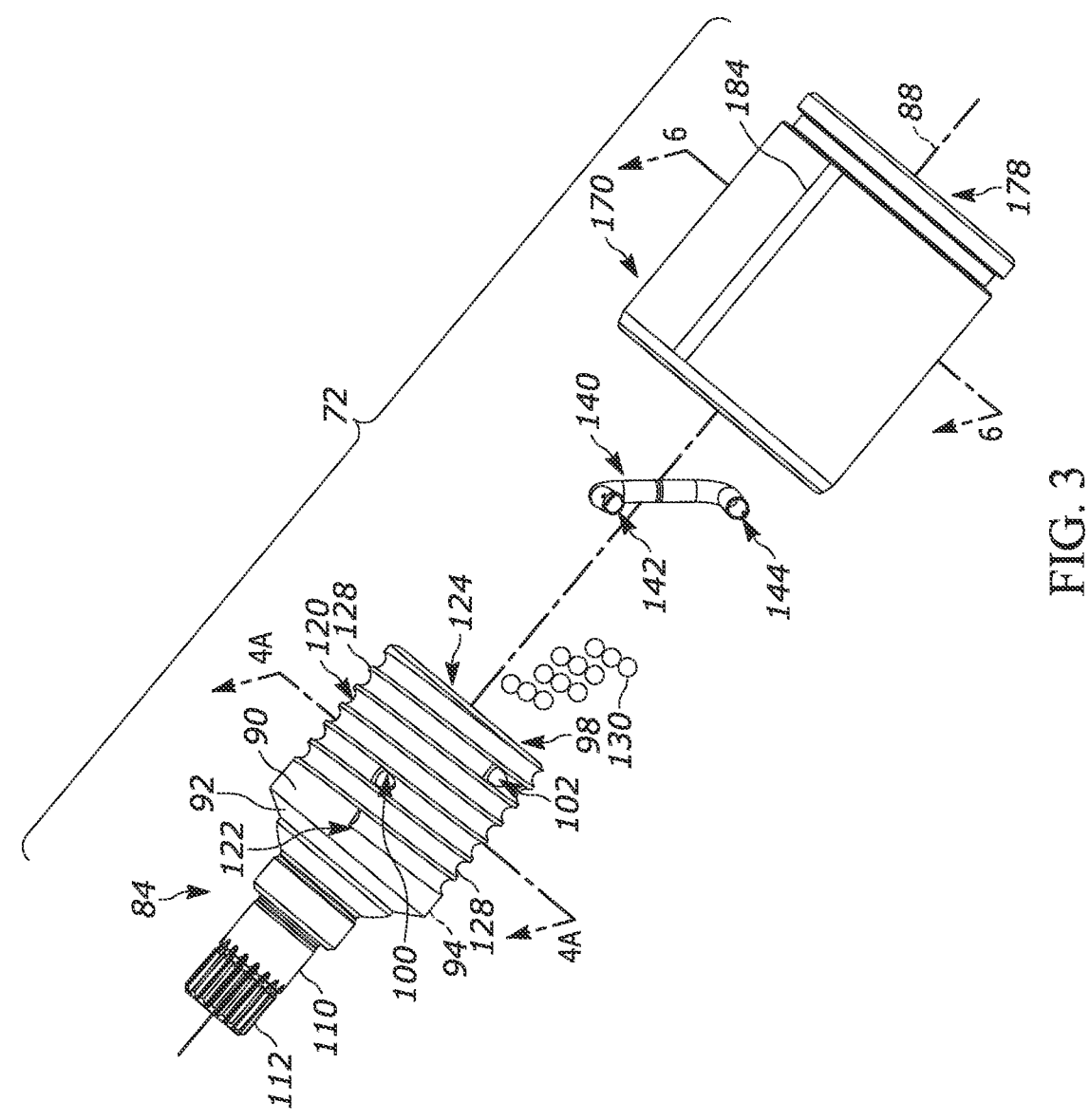
FIG. 3 is an exploded view of an example recirculating ball screw of the actuator assembly of FIG. 1.
Figure 4A:
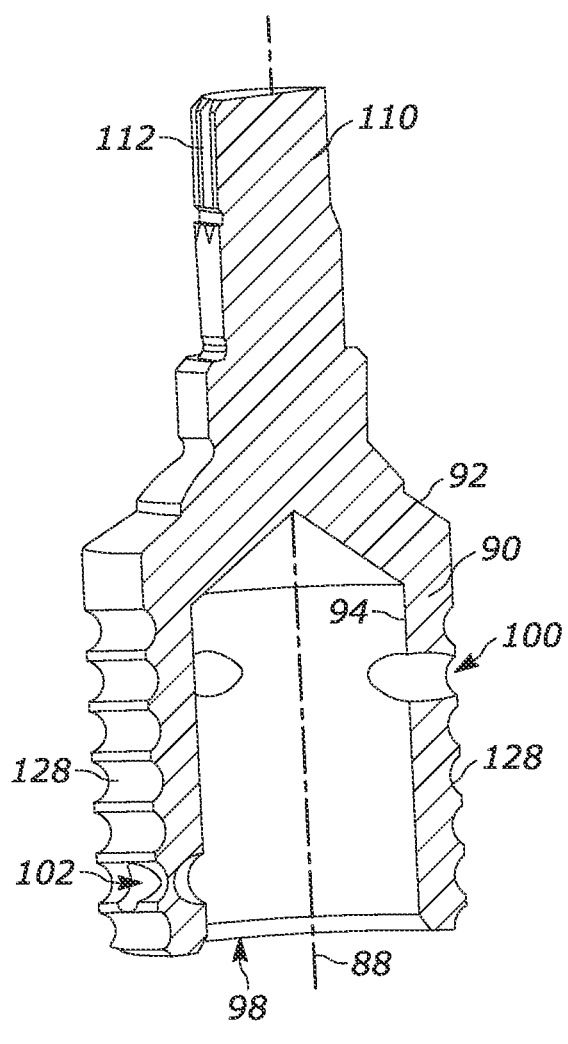
FIG. 4A is a section view taken along line 4A-4A of FIG. 3.
Figure 4B:
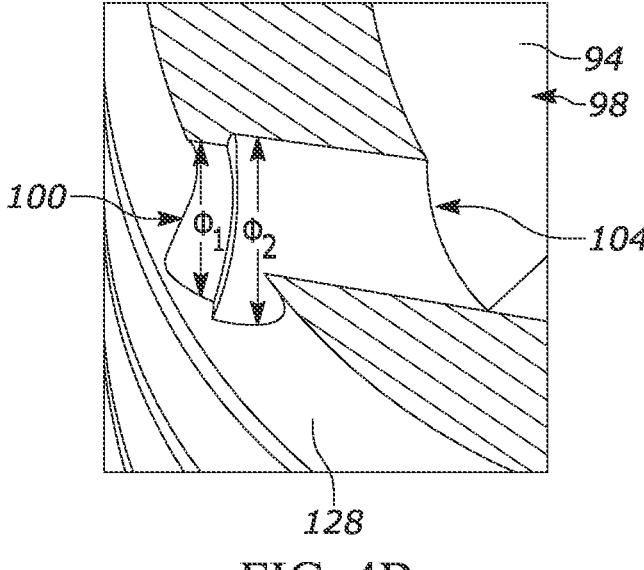
FIG. 4B is an enlarged view of a portion of FIG. 4A.

Turning to FIGS. 3-4A, the ball-screw drive 72 includes a recirculating ball screw 84 and a cooperating nut 170. The ball screw 84 extends along a centerline or axis 88 and includes a cylindrical base 90 having an outer surface 92 and an inner surface 94 defining an inner recess or pocket 98. A pair of openings 100, 102 extends radially through the base 90 from the outer surface 92 to the recess 98. Each of the openings 100, 102 has a respective counterbore 104, 106 (see FIG. 4B) extending outward from the inner surface 94. Each opening 100, 102 has a diameter $\Phi_1$ less than the diameter $\Phi_2$ of the corresponding counterbore 104, 106.

Figure 7A:
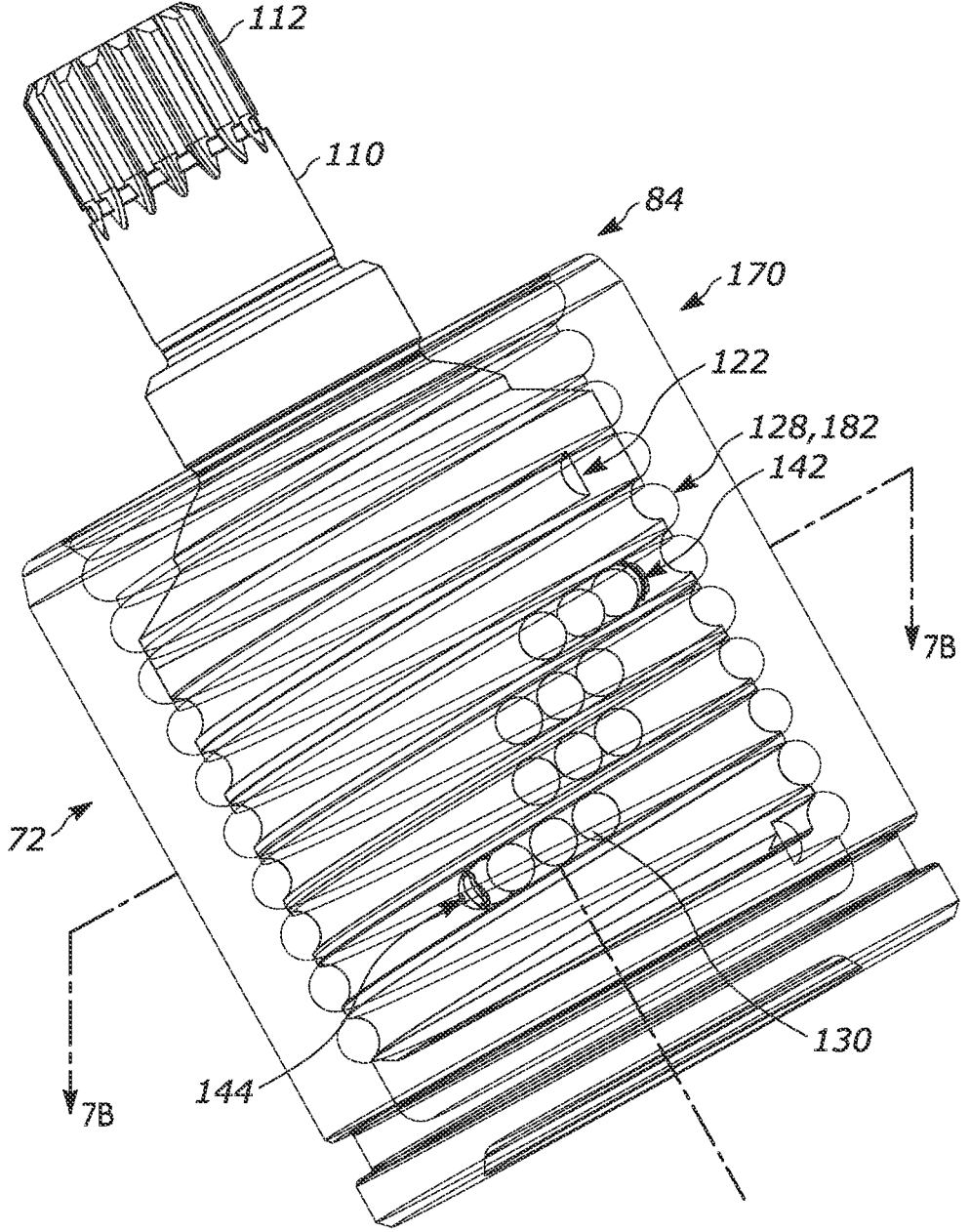
FIG. 7A is a schematic illustration of the assembled recirculating ball screw with the nut being transparent for clarity.
Figure 7B:
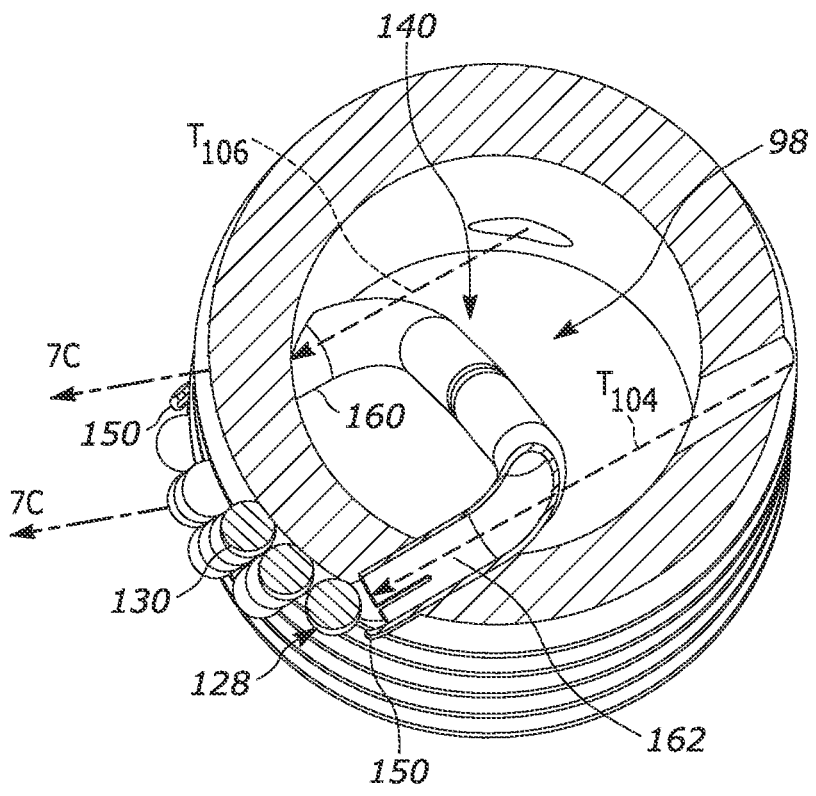
FIG. 7B is a section view taken along line 7B-7B of FIG. 7A.

In one example, the openings 100, 102 and counterbores 104, 106 are formed by drilling holes through an entire side of the base 90 as can be seen on FIG. 7B. To this end, the counterbore 104 is formed by drilling along the trajectory $T_{104}$ starting from one side of the base 90, passing through the recess 98, and the passing through to the other side of the base. The counterbored hole may be formed in two ways. One way is to drill through with a drill of diameter $\Phi1$, then drill again using a drill of diameter $\Phi_2$ starting from the same side, but only to a specific depth such that the counterbore 104 ends at a specific distance just prior to fully drilling though as can be seen on FIG. 4B.

The second way to form the counterbore with two diameters as shown on FIG. 4B, is to use a drill that has both diameters $\Phi_1$ and $\Phi_2$ and drill one time starting from one side of base 90 up to a specific depth such that the counterbore is finished as shown on FIG. 4B. It will be appreciated that the counterbore 106 can be formed by drilling along the trajectory $T_{106}$ in either of the same manners described above for the counterbore 104. The trajectories $T_{104}$, $T_{106}$ are generally on opposite sides of the axis 88 and extend generally in the same direction. As will be discussed, although this process results in four openings being formed in the base 90 only the openings 100, 102 are utilized.

Returning to FIG. 4A, a shaft 110 extends longitudinally from the base 90. One end of the shaft 110 includes a toothed portion 112 for connecting to the actuator output—the planet carrier 66—in a fixed manner, e.g., a splined connection. The ball screw 84 therefore rotates with the planet carrier 66. Due to this connection, the motor 28 utilizes the gear train 58 and planetary gear stage 48 to control rotation of the ball-screw drive 72, as will be discussed.

Referring to FIG. 3, a spiral winding 120 is provided along the exterior of the base 90. The spiral winding 120 has a curved cross-section along its length and extends along a helical path circumferentially along the outer surface 92 from a first end 122 to a second end 124. The successive passes of the track winding 120 define individual threads 128. The openings 100, 102 extend through the track winding 120 and are positioned between the ends 122, 124 thereof. Alternatively, the ends 122, 124 could terminate at the openings 100, 102 (not shown).

Balls 130 are provided in the track winding 120. The balls 130 can be formed from a durable material, such as metal. The cross-section of the track winding 120 is configured to ensure that the balls 130 are capable of rolling freely along the length of the track winding but are limited in the ability to deviate from the centerline of the track winding. In other words, the width of the track winding 120 is large enough to accommodate the balls 130 but not so large that the balls can roll up the sides of the cross-section. Moreover, the depth of the track winding 130 is configured such that roughly only half the volume of the balls 130 is disposed within the track winding while the remainder is positioned radially outward of the outer surface 92 of the base 90.

Figure 5A:
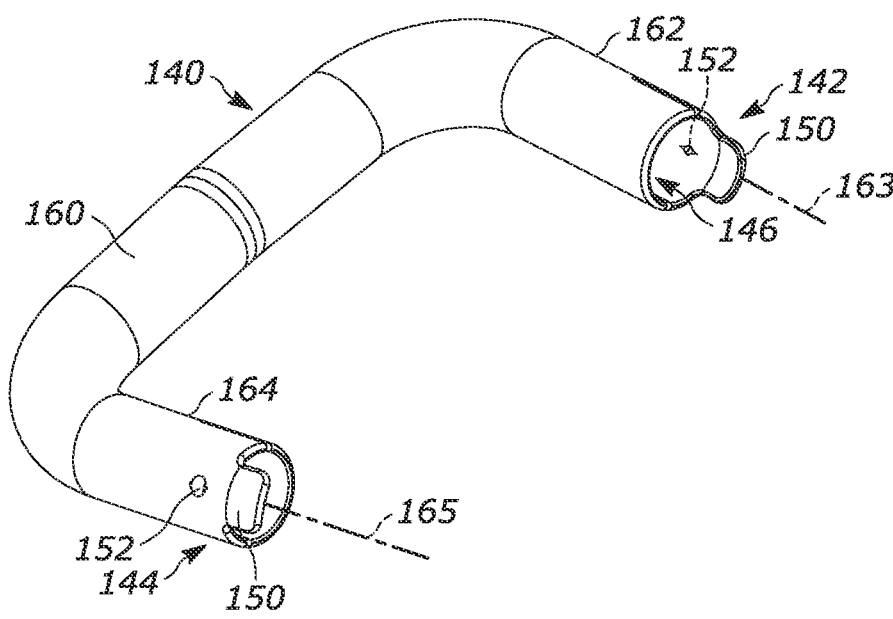
FIG. 5A is a perspective view of a ball return system for the recirculating ball screw.
Figure 5B:
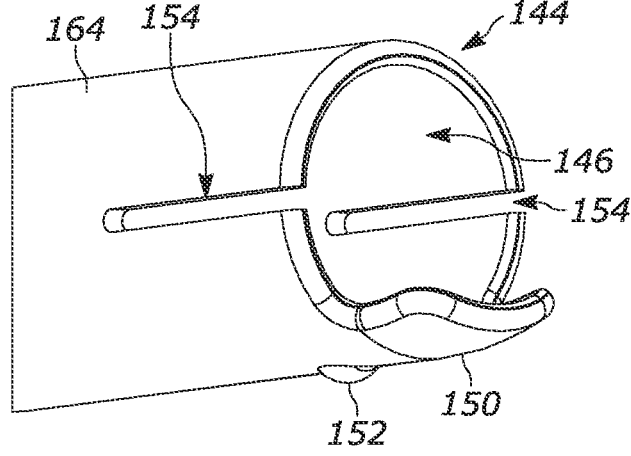
FIG. 5B is an enlarged view of a portion of FIG. 5A.

Referring to FIGS. 5A-5B, a ball return system 140 is provided for more directly connecting the openings 100, 102 with one another. To this end, the ball return system constitutes a tube 140 extending from a first end 142 to a second end 144. The tube 140 defines a central passage 146 extending the entire length between the ends 122, 124. The tube 140 is circular in cross-section with an inner diameter appropriately sized to allow the balls 130 to fit through.

A deflector 150 is provided at each end 142, 144 and extends about a portion of the circumference of each end 142, 144. The tube 140 can have any shape but as shown the tube is generally U-shaped. That said, the tube 140 includes a base 160 and a pair of legs 162, 164 extending from opposite ends thereof. The legs 162, 164 extend generally along respective axes 163, 165. In one example, the axes 163, 165 extend at an angle, e.g., an acute angle, relative to one another, i.e., the legs are not parallel to each other. Alternatively, the axes 163, 165 can extend parallel to one another (not shown). In such a configuration the legs 162, 164 would therefore extend parallel to one another.

A projection or dimple 152 is provided on each end 142, 144 and aligned with the deflector 150. As shown, the dimple 152 is round, e.g., hemispherical, and extends away from the central passage 146. A pair of slots 154 is provided at each end 142, 144 and extend along the length of the tube 140. The slots 154 extend parallel to each other and can be symmetrically arranged about the periphery of the tube 140. Although two slots 154 are shown it will be appreciated that more or fewer slots can be provided at each end 142, 144.

Figure 6:
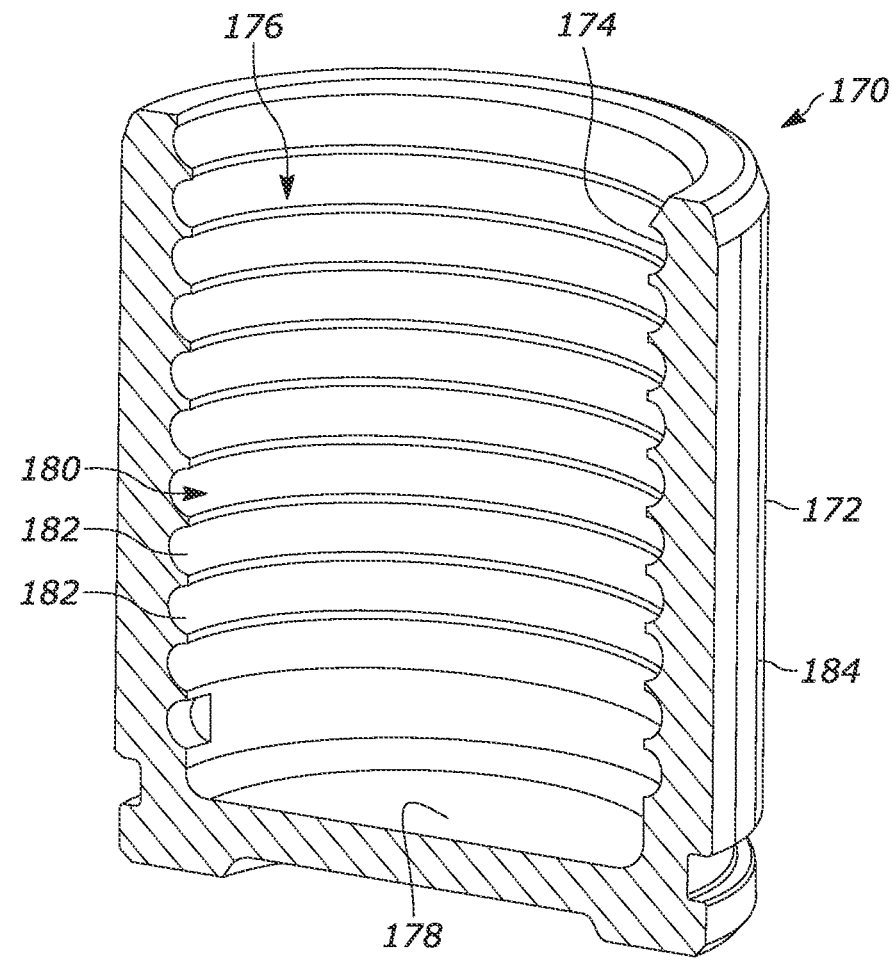
FIG. 6 is a section view of a nut taken along line 6-6 of FIG. 3.

Referring to FIG. 6, the nut 170 is cylindrical and includes an outer surface 172 and an inner surface 174 defining a central passage 176. The central passage 176 extends along the length of the nut 170 and terminates at an end wall 178. That said, the nut 170 is closed at one end. A track winding 180 is provided along the inner surface 174 and can exhibit, for example, a helical pattern, defined by individual turns 182 mirroring the contour of the track winding 120 on the ball screw 84. A groove 184 extends axially along the outer surface 172.

Figure 7C:
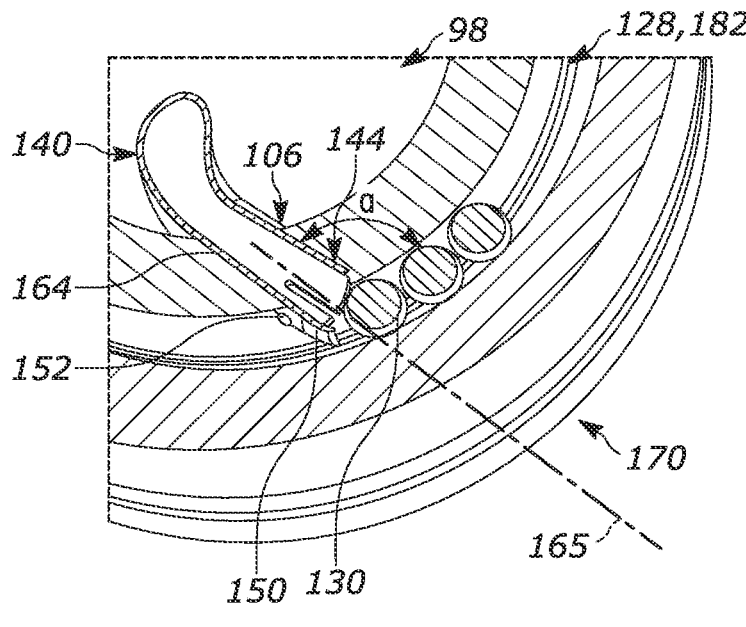
FIG. 7C is a section view taken along line 7C-7C of FIG. 7B.

FIGS. 7A-7C illustrate the fully assembled ball-screw device 72 in which the nut 170 is positioned over the ball screw 84 such that the track windings 128, 182 are radially aligned with one another. The balls 130 are positioned in and between the track windings 120, 180 and are capable of rolling within the track windings 128, 182.

The tube 140 is provided in the recess 98 of the base 90 and extends continuously/uninterrupted between the openings 100, 102. More specifically, the first end 142 extends radially outward into the counterbore 104 and through the opening 100 into the track winding 120. The second end 144 extends radially outward into the counterbore 106 and through the opening 102 into the track winding 120. In other words, the legs 162, 164 are positioned within the openings 100, 102 and supported by the base 90 while the base 160 of the tube 140 is unsupported within the recess 98.

The dimples 152 and slots 154 cooperate to help secure the tube 140 to the ball screw 84. To this end, the ends 142, 144 of the tube 140 are resiliently deformable due to the presence of the slots 154. Due to this configuration, the ends 142, 144 of the tube 140 can flex/compress while passing outward through the openings 100, 102. When each end 142, 144 passes through the respective opening 100, 102 sufficient to position the dimple within the track winding 120, the end expands to enable the dimple to snap into engagement with the root of the track winding (FIG. 7C). This helps to retain the ends 142, 144 of the tube 140 within the openings 100, 102 while providing a secure connection between the tube and the ball screw 84. The timing of the snap-fit connection via the dimples 152 coincides or substantially coincides with the end 142, 144 abutting the bottom or end of the counterbore 104, 106, effectively pinning the ends of the tube 140 in place. In other words, the ends 142, 144 of the tube 140 bottom out at the respective counterbore 104, 106.

The track windings 128, 182 and ball return system 140 cooperate to enable each of the balls 130 to roll from the first opening 100 to the second opening 102 and then return to the first opening via the ball return system 140. Similarly, each of the balls 130 can roll from the second opening 102 to the first opening 100 and then return to the second opening via the ball return system 140. In this manner, the track windings 120, 180 and the ball return system 140 cooperate to form a bi-directional, continuous recirculation loop for the balls 130. The direction of travel of the balls 130 is dependent on the direction of rotation of the ball screw 84.

It will be appreciated that the locations of the openings 100, 102 about the circumference and/or along the length of the base 90 can be selected to help reduce the complexity of the tube 140 needed to connect the openings as well as to optimize the path taken by the balls 130 as they exit the spiral track and deflect into the tube and vice versa. To this end, the locations of the openings 100, 102 can be selected to ensure the tube 140 has a desired number of elbows, turns, bends, radius of curvature, trajectory, etc., through the recess 98 in the base 90. For example, the openings 100, 102 could be located on generally the same side of the base 90 (as shown) or on different sides of the base (not shown).

In any case, the openings 100, 102 have trajectories through the base 90 that cause the legs 162, 164 of the tube 140 to have axes 163, 165 oriented in a desired manner. For instance, and as shown in FIG. 7C, the opening 102 is configured such that an angle $\alpha$ between the axis 165 and the trajectory of the track winding 120 is greater than 90°. A similar angle $\alpha$ can be provided between the axis 163 and the trajectory of the track winding 120 (not shown). It will be appreciated that the angle $\alpha$ is tied to the portion of the track winding 120 in which the balls 130 travel, i.e., to the right of the deflector 150 as shown in FIG. 7C. That said, the angle $\alpha$ defines the entry or exit angle for the balls 130—in this case an obtuse angle—traveling into or out of the tube 140 to facilitate ball entry into and exit from the recirculation tube 140.

Returning to FIGS. 1-2, ball-screw device 72 is positioned within the sleeve 70 and adjacent to the first brake pad BP1 within the caliper 15. The toothed portion 112 engages the carrier 66 to enable torque transmission therebetween. With this in mind, the ball-screw drive 72 is configured such that rotation of the ball screw 84 results in axial movement of the nut 170 along the axis 50 and along an inner, cylindrical running surface 76 of the sleeve 70. Axial movement of the nut 170 controls movement of the first brake pad BP1 towards and away from the rotor 19, as will be discussed.

The sleeve 70 includes a wall 200 extending transverse to the axis 50 and, thus, transverse to the direction of travel of the nut 170. As shown, the wall 200 is a flange extending radially inward from the sleeve 70 and including a central opening 204. A bearing 202 is axially supported on the wall 200 and aligned with the opening 204. The shaft 110 of the ball screw 84 is received by the bearing 202 and extends through the opening 204. This allows the toothed portion 112 at the end of the shaft 110 to mesh with the carrier 66 in the planetary gear train 48.

A passage 210 extends radially through the sleeve 70 to its interior. An anti-rotation element 118 extends through the passage 210 and engages an axially extending groove 184 in the nut 170. In one example, the anti-rotation element 212 is a screw and the wall of the passage 210 forms a threaded connection with the screw. In any case, the anti-rotation element 118 prevents rotation of the nut 170 relative to the sleeve 70, thereby restricting movement of the nut to along [not about] the axis 50. With that said, the ball screw 84 and the nut 170 have an advantageous, cooperative configuration that helps maximize the efficiency in converting rotation of the ball screw to axial movement of the nut.

An annular recess 220 is formed in the caliper 15 axially between the end of the sleeve 70 and the first brake pad BP1. A seal 222 having a bellows-like design is provided in the recess 220. The seal 222 is also connected to the nut 170 such that the seal is pulled apart or squeezed together during axial displacement of the nut 170.

In operation, the vehicle operator depresses the brake pedal (not shown) or the vehicle autonomously initiates a braking operation. In either case, the vehicle controller actuates the motor 28, which delivers torque through the gear train 58, through the planetary gear stage 48, and ultimately to the ball-screw drive 72. More specifically, torque delivered to the carrier 66 is delivered to the ball screw 84 through the toothed portion 112. The ball screw 84 rotates about the axis 50 in the manner $R_1$ (clockwise as shown) but is prevented from translating axially along the axis.

Rotation of the ball screw 84 in the manner $R_1$ causes the nut 170 to translate along the axis 50 in a direction away from the ball screw 84 and towards the first brake pad BP1. The anti-rotation feature 212 prevents the nut 170 from rotating during the axial translation. Continued rotation of the ball screw in the manner $R_1$ ultimately causes the nut 170 to engage the first brake pad BP1 and move the first brake pad against the brake rotor 19. In response to the reaction forces acting inside the actuator assembly 10 and the caliper 15, the second brake pad BP2 is thereby also placed on the brake rotor 19. The application of the brake pads BP1, BP2 on the rotor 19 is indicated generally by the opposing arrows F in FIG. 1.

During axial translation of the nut 170 along the ball screw 84, the balls 130 are forced to travel through the respective track windings 120, 180 while maintaining connection with the ball screw. In other words, the balls 130 maintain engagement with the track winding 180 in the nut 170 when disposed along the exterior of the ball screw 84 but the balls are always recirculated through the ball screw 84.

Figure 8:
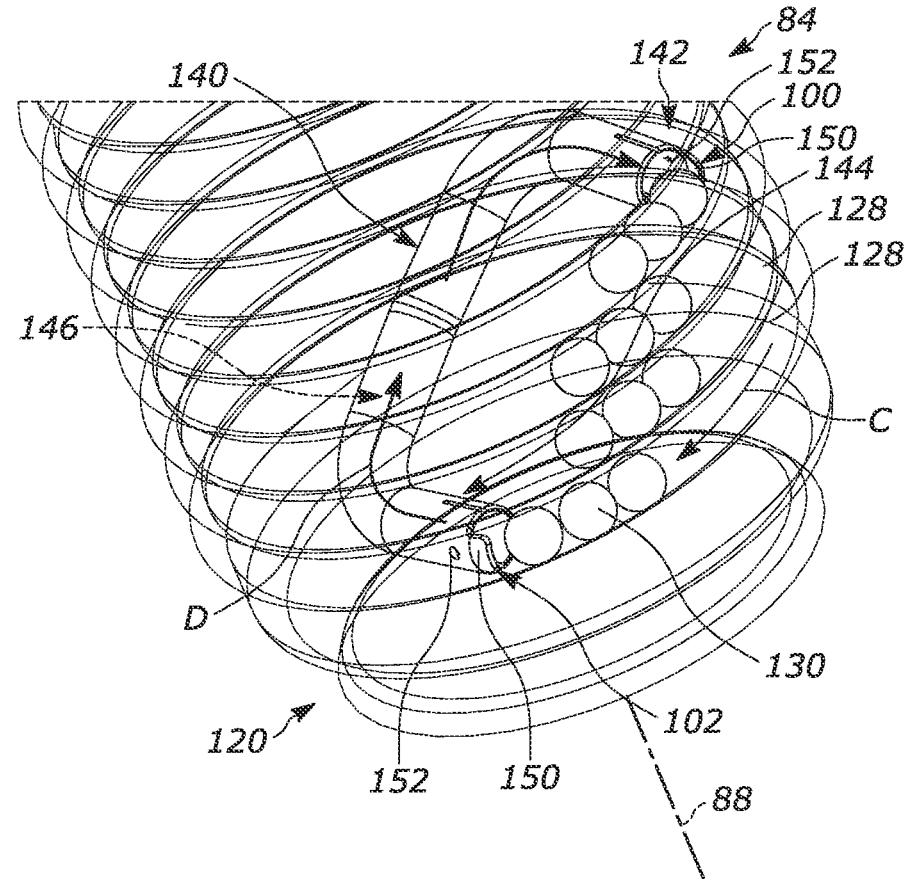
FIG. 8 is a schematic illustration of the recirculating ball screw during operation.

In one example shown in FIG. 8, the balls 130 travel from the first opening 100 to the second opening 102 by rolling along the spiral path of the cooperating track windings 120, 180 in the manner indicated at C. The balls 130 are then guided by the deflector 150 into the second end 144 of the tube 140. The balls 130 then roll through the central passage 146 along the length of the tube 140 in the manner D. The balls 130 roll out of the first end 142 of the tube 140 and are guided by the deflector 150 out the first opening 100 back into the cooperating track windings 120, 180. The process then automatically repeats as needed during the entire axial movement of the nut 170 relative to the rotating ball screw 84. In other words, the recirculation is an endless, closed loop.

One having ordinary skill in the art would recognize that facilitating the travel path of the balls 130 between the openings 100, 102 helps more rapidly recirculate/replenish the balls within the cooperating track windings 128, 182. This, in turn, facilitates relative movement between the ball screw 84 and the nut 170, which facilitates axial displacement of the nut along the axis 50 relative to the brake pads BP1, BP2. Consequently, configuring the angle α as obtuse provides a gentler/easier travel path for the balls 130 as they enter/exit the ends 142, 144 of the tube 140. Moreover, it will be appreciated that the inner diameter of the tube 140 is substantially equal to the diameter of openings 100, 102 to promote smooth ball 130 travel therethrough and therebetween.

Once the braking operation is complete, the motor 28 is rotated in the opposite direction to thereby rotate the ball screw 84 in the opposite direction $R_2$ (counterclockwise as shown). It is understood that, by operating the motor 28, the nut 170 can likewise be moved into a retracted position which is associated with lifting the first brake pad BP1 and the second brake pad BP2 off the brake rotor 19. As the nut 170 retracts back over the ball screw 84, the balls 130 are recirculated through the track winding 120 and tube 140 in the reverse direction to that shown in FIG. 8. In other words, the balls 130 roll through the cooperating track windings 120, 180 in a direction opposite C and through the tube 140 in a direction opposite D. In both cases, the recirculation path is through the interior of the ball screw 84 but spaced therefrom due to the use of the unsupported tube 140 within the recess 98.

The present invention is advantageous in that the ball return system can be precisely formed to provide the more efficient return path for the balls between the ends of the track winding. The dimples help to locate the ends of the ball return system within the track winding and the deflectors facilitate entry and exit of the balls to/from the track winding. The openings in the ball screw and the legs of the tube help to provide a more desirable path for the balls as they enter/exit the tube.

In the case of using a tube as the ball return system, the contour of the tube can provide a smooth rolling surface and rolling contour compared to existing ball systems that rely on, for example, holes or paths drilled into the ball-screw device. Providing the inner recess within the ball screw to accommodate the ball return system also helps reduce the weight of the ball screw, which reduces the resistance to rotation by the motor.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A ball-screw drive for an actuator assembly of a vehicle brake, comprising:
   a ball screw rotatable about an axis and having an exterior track winding extending around the ball screw from a first opening to a second opening, an inner recess extending into the ball screw and being connected to the first and second openings;
   a ball nut including an interior track winding and being positioned over the ball screw so as to be movable along the axis in response to rotation of the ball screw for applying the vehicle brake;
   balls provided between the track windings; and
   a tube extending continuously through the ball screw recess between the openings and cooperating with the track windings to form a recirculation loop for the balls during brake application.

2. The ball-screw drive as recited in claim 1, wherein the tube comprises a bent tube having a first end positioned within the first opening and a second end positioned within the second opening.

3. The ball-screw drive as recited in claim 1, further comprising deflectors provided at opposing ends of the tube for directing balls into and out of the respective first and second openings.

4. The ball-screw drive as recited in claim 3, wherein the deflectors are integrally formed with the tube and extend partially around a circumference of the tube.

5. The ball-screw drive as recited in claim 1, wherein the tube is unsupported within the recess between the first and second openings.

6. The ball-screw drive as recited in claim 1, wherein the exterior track winding extends in a spiral manner around an axis of the ball screw and continuously between the first and second openings.

7. The ball-screw drive as recited in claim 1, wherein each of the first and second openings includes a counterbore extending radially outward from the inner recess.

8. The ball-screw drive as recited in claim 1, wherein first and second ends of the tube form snap-fit connections with the ball screw to retain the first and second ends within the first and second openings.

9. The ball-screw drive as recited in claim 8, wherein each of the first and second openings includes a counterbore extending radially outward from the inner recess, the first and second ends of the tube bottoming out in the counterbores and including radially outwardly extending deflectors having dimples forming snap-fit connections with the external track winding on the ball screw.

10. The ball screw recited in claim 1, wherein first and second openings have a diameter that is substantially equal to an inner diameter of the tube to promote a smooth path for ball recirculation.

11. The ball-screw drive as recited in claim 1, wherein the tube extends from the recess radially outward and through the first and second openings to the track windings.

12. The ball-screw drive as recited in claim 1, wherein slots are formed at opposing ends of each tube such that the opposing ends are resiliently deformable in response to insertion into the first and second openings.

13. An actuator assembly for a vehicle brake, comprising the ball-screw drive according to claim 1, wherein the nut forms a brake piston.

14. A ball-screw drive for an actuator assembly of a vehicle brake, comprising:

a ball screw rotatable about an axis and having an exterior track winding extending around the ball screw from a first opening to a second opening, an inner recess extending into the ball screw and being connected to the first and second openings;

a ball nut including an interior track winding and being positioned over the ball screw so as to be movable along the axis in response to rotation of the ball screw for applying the vehicle brake;

balls provided between the track windings; and a bent tube extending continuously through the recess in an unsupported manner and having a first end positioned within the first opening and a second end positioned within the second opening, the first and second ends having deflectors for directing balls into and out of the respective first and second openings, the tube cooperating with the track windings to form a recirculation loop for the balls during brake application.

15. The ball-screw drive as recited in claim 14, wherein the deflectors are integrally formed with the tube and extend partially around a circumference of the tube.

16. The ball-screw drive as recited in claim 14, wherein the exterior track winding extends in a spiral manner around an axis of the ball screw and continuously between the first and second openings.

17. The ball-screw drive as recited in claim 14, wherein ends of the tube form snap-fit connections with the ball screw to retain the ends within the first and second openings.

18. The ball-screw drive as recited in claim 14, wherein each of the first and second openings includes a counterbore extending radially outward from the inner recess, the first and second ends of the tube bottoming out in the counterbores while dimples on the deflectors form snap-fit connections with the external track winding on the ball screw.

19. The ball screw recited in claim 14, wherein first and second openings have a diameter that is substantially equal to an inner diameter of the tube to promote a smooth path for ball recirculation.

20. The ball-screw drive as recited in claim 14, wherein the tube extends from the recess radially outward and through the first and second openings to the track windings.

21. The ball-screw drive as recited in claim 14, wherein slots are formed at opposing ends of each tube such that the opposing ends are resiliently deformable in response to insertion into the first and second openings.

22. An actuator assembly for a vehicle brake, comprising the ball-screw drive according to claim 14, wherein the nut forms a brake piston.

\* \* \* \* \*